United States Patent
Silvestri et al.

(10) Patent No.: US 6,673,869 B2
(45) Date of Patent: *Jan. 6, 2004

(54) TRANSPARENT ELASTOMERIC THERMOPLASTIC POLYOLEFIN COMPOSITIONS

(75) Inventors: Rosanna Silvestri, Schio (IT); Jean News, Ferrara (IT)

(73) Assignee: Basell Polioefine Italia S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/912,761

(22) Filed: Jul. 25, 2001

(65) Prior Publication Data

US 2002/0035210 A1 Mar. 21, 2002

(30) Foreign Application Priority Data

Jul. 27, 2000 (EP) .............................................. 00202691

(51) Int. Cl.⁷ .......................... C08L 23/00; C08L 23/04
(52) U.S. Cl. ........................................ 525/191; 525/240
(58) Field of Search .............................. 525/191, 240

(56) References Cited

U.S. PATENT DOCUMENTS

| | | | |
|---|---|---|---|
| 4,399,054 A | 8/1983 | Ferraris et al. | |
| 4,892,851 A | 1/1990 | Ewen et al. | 502/104 |
| 5,286,564 A | 2/1994 | Cecchin et al. | 428/402 |
| 5,770,753 A | 6/1998 | Küber et al. | 556/11 |
| 5,786,432 A | 7/1998 | Küber et al. | 526/127 |
| 5,840,644 A | 11/1998 | Küber et al. | 502/117 |
| 6,051,727 A | 4/2000 | Küber et al. | 556/11 |
| 6,242,544 B1 | 6/2001 | Küber et al. | 526/127 |
| 6,255,506 B1 | 7/2001 | Küber et al. | 556/11 |
| 6,376,613 B1 * | 4/2002 | Pelliconi et al. | 525/240 |
| 2001/0021755 A1 | 9/2001 | Küber et al. | 526/127 |

FOREIGN PATENT DOCUMENTS

| | | |
|---|---|---|
| EP | 0045977 | 2/1982 |
| EP | 0361493 | 4/1990 |
| EP | 0395083 | 10/1990 |
| EP | 0575875 | 12/1993 |
| EP | 0576970 | 1/1994 |
| EP | 0604917 | 7/1994 |
| EP | 0629632 | 12/1994 |
| EP | 0666284 | 8/1995 |
| EP | 0697436 | 2/1996 |
| EP | 0728769 | 8/1996 |
| WO | 9602580 | 2/1996 |
| WO | 9611218 | 4/1996 |
| WO | 9622995 | 8/1996 |
| WO | 9623838 | 8/1996 |
| WO | 9843931 | 10/1998 |
| WO | 9921899 | 5/1999 |
| WO | 0001738 | 1/2000 |
| WO | 0121674 | 3/2001 |

* cited by examiner

Primary Examiner—Nathan M. Nutter

(57) ABSTRACT

An elastomeric thermoplastic polyolefin composition comprising (I) a crystalline propylene polymer containing at least 80% by weight of a fraction insoluble in xylene at room temperature, the intrinsic viscosity being higher than 0.5 dL/g; (II) an atactic or amorphous propylene polymer having an intrinsic viscosity higher than 0.5 dL/g; and (III) an elastomeric olefin polymer comprising copolymers of ethylene with a comonomer selected from $C_3$–$C_8$ α-olefins, the intrinsic viscosity ranging from 1 to 4 dL/g. In said polyolefin composition the density of the elastomeric olefin polymer ($d_{eOP}$) satisfies the following relationship:

$$d_{eOP} \pm 0.005 = \{d_{cPP} \times [w_{cPP}/(w_{cPP}+w_{aPP})]\} + \{d_{aPP} \times [w_{aPP}/(w_{cPP}+w_{aPP})]\} \quad (1)$$

wherein $w_{cPP}$ and $w_{aPP}$ are the weight percentage content of components (I) and (II) respectively and $d_{cPP}$ and $d_{aPP}$ are the density at room temperature of components (I) and (II) respectively.

11 Claims, No Drawings

TRANSPARENT ELASTOMERIC THERMOPLASTIC POLYOLEFIN COMPOSITIONS

The present invention relates to an elastomeric thermoplastic polyolefin composition and a process for producing the composition and articles obtained therefrom.

The compositions of the present invention can be used in many applications, especially those where soft, transparent and impact resistant materials are required.

Compositions suitable for use in the same field as the present composition due to the similar mechanical, optical and tactile properties are already known. An example of said compositions is soft polyvinyl chloride. However, the polyvinyl chloride suffers from a number of disadvantages. The migration and extractability of plasticizers, discoloration and difficulty in treating its wastes are examples of said disadvantages. Hence, due to said shortcomings it is highly desirable to replace the polyvinyl chloride. In particular the migration and extractability of plasticizers in biologic liquids are unwelcome when the polyvinyl chloride is used in certain applications such as medical and food applications.

Hence, there is a need for substitutes for PVC in these applications.

Suitable known olefin-based compositions are made of polyethylene or thermoplastic elastomeric olefin polymers. Examples of the latter compositions are described in European patent application 666284. Said European patent application discloses a blend of an amorphous polypropylene with a crystalline propylene polymer or an olefin-based thermoplastic elastomer composition. These compositions are endowed with good transparency and high softness. However, they do not have good resistance to high temperatures such as the steam sterilization temperature.

A new polyolefin composition has now been found that does not have the above-mentioned shortcomings and has a good balance of softness, transparency, impact resistance at low temperatures and resistance to heat. Thanks to the high temperature resistance, the composition can be sterilized in an autoclave.

The good impact resistance at low temperatures (i.e., −20° C.) of the compositions according to the present invention is achieved without affecting the transparency and the heat resistance of the composition.

Moreover, a further advantage of the compositions of the present invention is the resistance to blooming. Blooming can be a severe problem in soft polymeric compositions because it causes surface stickiness.

Accordingly, the present invention provides an elastomeric thermoplastic polyolefin composition comprising:
(I) a crystalline propylene polymer (cPP) containing at least 80% by weight, preferably about 94% by weight, of a fraction insoluble in xylene at room temperature, the intrinsic viscosity being higher than 0.5 dl/g;
(II) an atactic or amorphous propylene polymer (aPP) having an intrinsic viscosity higher than 0.5 dl/g; and
(III) an elastomeric olefin polymer (eOP) consisting of copolymers of ethylene with a comonomer selected from $C_3$–$C_8$ α-olefins, the intrinsic viscosity ranging from 1 to 4 dl/g;
in said polyolefin composition the density of the elastomeric olefin polymer ($d_{eOP}$) satisfies the following relationship:

$$d_{eOP} \pm 0.005 = \{d_{cPP} \times [w_{cPP}/(w_{cPP}+w_{aPP})]\} + \{d_{aPP} \times [w_{aPP}/(w_{cPP}+w_{aPP})]\} \quad (1)$$

wherein $w_{cPP}$ and $w_{aPP}$ are the weight percentage content of components (I) and (II) respectively and $d_{cPP}$ and $d_{aPP}$ are the density at room temperature of components (I) and (II) respectively.

Room temperature means a temperature of about 23° C.

The polyolefin composition of the present invention can contain the above three components, i.e., cPP, aPP and eOP, in any amount, provided that the above relationship between the density is satisfied. However, particularly suitable compositions according to the present invention comprise 5–55 wt. %, preferably 5 less than 40 wt. %, such as 39 wt. %, of cPP, 1–55 wt. % of aPP and 1–55 wt. % of eOP, based on the total amount (100 wt. %) of components (I) to (III).

The crystalline propylene polymer (cPP) can be selected from both syndiotactic and isotactic polymers. They comprise both a propylene homopolymer and a random copolymer of propylene with recurring units derived from ethylene and/or 1-butene. The comonomer ranges preferably from 0.5 to 20% by mole.

Generally, the intrinsic viscosity of an isotactic propylene polymer ranges from 0.6 to 6 dl/g. Those polymers having an intrinsic viscosity higher than 1 dl/g, preferably higher than 1.5 dl/g, are the most suitable components for the composition of the present invention.

The melting temperature of an isotactic propylene polymer is generally between 110 and 160° C., and can even reach values above 160° C.

Particularly suitable for the composition of this invention are isotactic propylene polymers having a melting enthalpy greater than 80 J/g, preferably greater than 90 J/g.

The fraction of these polymers soluble in xylene at 23° C. is generally less than 10%.

The molecular weight distribution of these polymers $M_w/M_n$ is generally broad, i.e., larger than 5.

Suitable isotactic propylene polymers are commercially available isotactic polypropylene, for example, which are produced by polymerizing the relevant monomer(s) according to known processes in the presence of conventional titanium- or vanadium-based heterogeneous Ziegler-Natta-type catalysts.

Metallocene-based isotactic propylene polymers having the above-described characteristics can also be used. Polymers made by means of metallocenes generally have narrow molecular weight distribution $M_w/M_n$, such as values of lower than 4. Suitable propylene polymers are described, for example, in European patent applications 576970 and 629632. Said polymers can be prepared according to known methods by using a catalytic system comprising the racemic form of dimethylsilanediyl-bis[1-(2-ethyl-4-phenylindenyl)] zirconium dichloride, for example, as the metallocene catalyst and an activating cocatalyst, such as alumoxane.

Generally, the intrinsic viscosity of syndiotactic propylene polymers ranges from 0.6 to 6 dl/g. Those polymers having an intrinsic viscosity higher than 1.0 dl/g, preferably higher than 1.3 dl/g, are the most preferred as components of the composition of the present invention.

The melting temperature of a syndiotactic propylene homopolymer is generally between 110 and 150° C. and the melting enthalpy is generally between 20 and 50 J/g. For the composition of the present invention those syndiotactic polymers having a melting enthalpy higher than 30 J/g, preferably higher than 40 J/g, are the most suitable.

Suitable syndiotactic polymers and catalytic systems are, respectively, described in EP-A-697436 and U.S. Pat. No. 4,892,851. Said polymers can be prepared according to known methods by using a catalytic system comprising isopropylidene(cyclopentadienyl)(9-fluorenyl) zirconium dichloride, for example, as the syndiospecific metallocene catalyst, and an activating cocatalyst.

The atactic or amorphous propylene polymer (aPP) is preferably a propylene homopolymer. However, it can also be a propylene copolymer with recurring units deriving from ethylene and/or 1-butene. The amount of comonomer ranges preferably from 0.5 to 13 mol %.

The aPP is substantially devoid of crystallinity. Its melting enthalpy is generally lower than about 20 J/g, preferably lower than 10 dl/g.

Preferably, the aPP suitable as a component for the composition of the present invention has an intrinsic viscosity equal to or higher than 1.0 dl/g, and it can reach values higher than 3 dl/g, for example. The molecular weight distribution $M_w/M_n$ of aPP is lower than 5, preferably lower than 4, and more preferably lower than 3.

The structure of aPP determined by $^{13}C$-NMR analysis appears substantially atactic, although the polymers have a varying content of isotactic and syndiotactic sequences.

Suitable aPP as well as the polymerization process thereof is described in the international patent application WO 00/1738. Said aPP generally has isotactic sequences, in particular pentads, more numerous than syndiotactic. The percentage of the isotactic triads, % (mm), is typically in the range from 10 to 80. Those polymers with the shortest isotactic sequences show no detectable melting enthalpy. More particularly, the aPP has the following properties:

the ratio of the pentads (mmmm)/(rrrr) being equal to or greater than 1.5, preferably equal to or greater than 2.0; and the ratio of the pentads (mmmm)/(mmmr) being equal to or greater than 0.8, preferably equal to or greater than 0.9, most preferably equal to or greater than 1.

Said aPP is the preferred component of the composition of the present invention when the cPP component is an isotactic propylene polymer.

According to international patent application WO 00/01738, the aPP is polymerized in the presence of the racemic form of metallocene compounds having the following formula:

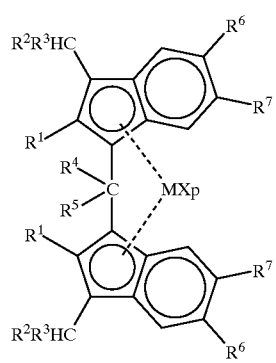

(I)

wherein substituents $R^1$ are hydrogen atoms;

$R^2$ and $R^3$ are, independently from each other, $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radicals, optionally containing silicon or germanium atoms;

or where $R^2$ and $R^3$ can be joined together to form a 4 to 6 membered ring or a 6 to 20 fused ring system;

$R^4$ and $R^5$ can be the same or different and are hydrogen atoms or —$CHR^8R^9$ groups;

$R^4$ and $R^5$ can form a ring having 3 to 8 carbon atoms that can contain heteroatoms;

the $R^8$ and $R^9$ substituents can be the same or different and are hydrogen atoms, $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radicals, which can form a ring having 3 to 8 carbon atoms that can contain heteroatoms;

the $R^6$ and $R^7$ substituents can be the same or different and are hydrogen, $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radicals, optionally containing silicon or germanium atoms; and optionally two adjacent $R^6$ and $R^7$ substituents can form a ring comprising from 5 to 8 carbon atoms;

M is a transition metal selected from those belonging to groups 3, 4, 5, 6 or to the lanthanide or actinide groups in the Periodic Table of the Elements (new IUPAC version);

X can be the same or different and is a monoanionic ligand such as a hydrogen atom, a halogen atom, a $R^{10}$, $OR^{10}$, $OSO_2CF_3$, $OCOR^{10}$, $SR^{10}$, $NR^{10}_2$ or $PR^{10}_2$ group, wherein the substituents $R^{10}$ are a $C_1$–$C_{20}$-alkyl, $C_3$–$C_{20}$-cycloalkyl, $C_2$–$C_{20}$-alkenyl, $C_6$–$C_{20}$-aryl, $C_7$–$C_{20}$-alkylaryl or $C_7$–$C_{20}$-arylalkyl radical, optionally containing silicon or germanium atoms;

p is an integer from 0 to 3, p being equal to the oxidation state of the metal M minus two.

In the metallocene of formula (I), the transition metal M is preferably selected from titanium, zirconium and hafnium. More preferably, the transition metal M is zirconium.

The X substituents are preferably chlorine atoms or methyl groups.

The $R^6$ and $R^7$ substituents are preferably hydrogen atoms.

Suitable metallocene compounds of formula (I) are listed in the above-mentioned international patent application. Particularly suitable compounds are isopropylidene-bis[1-(3-isopropylindenyl)] zirconium dichloride and methylene-bis[1-(3-isopropylindenyl)] zirconium dichloride.

The preparation of the ligands for the metallocenes of formula (I) can be carried out by known methods. A particularly suitable method for preparing the ligands for the metallocenes of formula (II), wherein $R^4$ and $R^5$ are hydrogen atoms, are reported in WO 98/43931 and the above-mentioned international patent application.

Transparent blends of cPP and aPP described in said international patent application WO 00/1738 can be advantageously used as the matrix in the composition according to the present invention. Both cPP and aPP have a quite high molecular weight. Thus, the intrinsic viscosity of the blend is generally higher than 0.5 dl/g, and can reach values higher than 3 dl/g. Said blends have the cPP/aPP weight ratio of 10:90 and 90:10. More preferably, the ratio ranges between 30:70 and 70:30.

Certain suitable aPPs have syndiotactic diads (r) more numerous than the isotactic ones (m); the (r) content can surpass the (m) content of greater than 5%. Said aPPs are the preferred component of the composition of the present invention when the cPP component is a syndiotactic propylene polymer. Examples of such polymers are those polymers having a Bernoullian index of about 1±0.2, preferably within the range 0.9–1.1. The Bernoullian index (B) is defined as B=4 [mm][mr]/[mr]$^2$.

The above aPPs are already known. They are described in European patent application 666284, for example. They can be obtained by polymerization according to known methods with Zr, Ti or Hf metallocene catalysts. Examples of catalysts and of the process for preparing suitable aPPs are described in European patent application 604917. The metallocene compounds described therein have two fluorenyl rings joined through a bivalent radical, such as a Si, Ge, C, or N ligand. Examples of bivalent radicals are dimethylsilanyl, methylene, and isopropylidene. In particular, the described metallocene compounds have the following general formula:

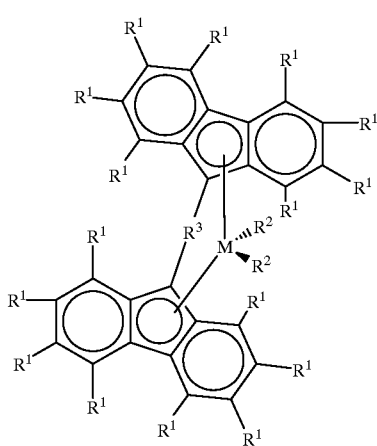

(II)

wherein substituents $R^1$ can be the same or different and are hydrogen atoms, $C_1$–$C_{20}$ alkyl radicals, $C_3$–$C_{20}$ cycloalkyl radicals, $C_2$–$C_{20}$ alkenyl radicals, $C_6$–$C_{20}$ aryl radicals, $C_7$–$C_{20}$ alkylaryl radicals, or $C_7$–$C_{20}$ arylalkyl radicals, optionally two adjacent substituents $R^1$ can form a ring comprising from 5 to 8 carbon atoms and, furthermore, the substituents $R^1$ can contain Si or Ge atoms;

M is Ti, Zr or Hf, substituents $R^2$ can be the same or different and are halogen atoms, —OH, —SH, $R^1$, —$OR^1$, —$SR^1$, —$NR^1_2$ or $PR^1_2$, wherein $R^1$ is defined as above;

the group $R^3$ is selected from >$CR^1_2$, >$SiR^1_2$, >$GeR^1_2$, >$NR^1$ or >$PR^1$, wherein $R^1$ is defined as above and optionally, when $R^3$ is >$CR^1_2$, >$SiR^1_2$ or >$GeR^1_2$, both substituents $R^1$ can form a ring comprising from 3 to 8 atoms;

optionally, as a reaction product with an aluminum organometallic compound of formula $AlR^4_3$ or $Al_2R^4_6$, wherein substituents $R^4$ can be the same or different and are $R^1$ or halogen. A specific example of formula (II) is dimethylsilanediyl-bis(9-fluorenyl)zirconium dichloride.

The elastomeric olefin polymer (eOP) is preferably selected from copolymers of ethylene with at least 20% by weight, preferably from 20 to 80 wt. %, of a $C_3$–$C_8$ α-olefin ($^{13}$C-NMR analysis, see the method below). The preferred α-olefins are propylene, 1-butene and 1-octene. The eOP can optionally contain recurring units derived from a diene. When present, the diene is used in an amount of from 0.5 to 10% by weight with respect to the whole eOP.

Generally, the eOP preferably has a glass transition temperature lower than −10° C.

The eOP can be prepared using known metallocene catalysts. Preferred examples of the elastomeric olefin polymers are commercial elastomeric copolymers of ethylene with 1-butene or 1-octene having from 20 to 40 wt % of comonomer ($^{13}$C-NMR analysis).

A specific example of said ethylene/1-octene copolymer is Engage® 8180 copolymer containing 66 wt. % of ethylene and 34 wt. % of 1-octene ($^{13}$C-NMR analysis), having a density of 0.865 g/ml according to ASTM D 792.

Another specific example of the ethylene/1-octene copolymer is Engage® 8150 copolymer containing 68 wt. % ethylene and 32 wt. % 1-octene ($^{13}$C-NMR analysis), having a density of 0.871 g/ml according to ASTM D 792.

A specific example of the ethylene/1-butene copolymer is Exact® 4033 copolymer containing 79 wt. % ethylene and 21 wt. % 1-butene ($^{13}$C-NMR analysis), having a density of 0.881 g/ml according to ASTM D 792.

Another specific example of the ethylene/1-butene copolymer is Exact® 4049 copolymer containing 75 wt. % ethylene and 25 wt. % 1-butene ($^{13}$C-NMR analysis), having a density of 0.875 g/ml according to ASTM D 792.

The eOP can be also be synthesized using Ziegler-Natta catalysts containing Ti or V, for example. The ethylene content is preferably less than 40% by weight, 20–38 wt. % for example. The molecular weight distribution $M_w/M_n$ of these polymers can range from 2 to 10, and it can be even higher than 10.

The Ziegler-Natta catalysts used in the process for preparing the above crystalline and non-crystalline polymers are obtained by contacting:

(a) a solid catalyst component comprising a titanium compound having at least one titanium-halogen bond, and an electron-donor compound, both supported on a magnesium halide in active form;

(b) an Al-alkyl compound; and, optionally, (c) an external electron-donor compound.

Solid catalyst component (a) is well known in patent literature. Particularly advantageous are the catalysts described in U.S. Pat. No. 4,399,054 and European patent applications 45977 and 395083.

In general, the solid catalyst components used in said catalyst comprise, as electron-donor compounds, compounds selected from ethers, ketones, lactones, compounds containing N, P and/or S atoms and esters of mono- and dicarboxylic acids. Particularly suitable electron-donor compounds are phthalic acid esters, such as diisobutyl, dioctyl, diphenyl and benzylbutyl phthalate.

Other electron-donors particularly suitable are 1,3-diethers of the formula (I):

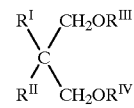

wherein $R^I$ and $R^{II}$ are the same or different and are $C_1$–$C_{18}$ alkyl, $C_3$–$C_{18}$ cycloalkyl or $C_7$–$C_{18}$ aryl radicals; $R^{III}$ and $R^{IV}$ are the same or different and are $C_1$–$C_4$ alkyl radicals; or are 1,3-diethers in which the carbon atom in position 2 belongs to a cyclic or polycyclic structure made up of 5, 6 or 7 carbon atoms and containing two or three sites of unsaturation.

Ethers of this type are described in published European patent applications 361493 and 728769. Representative examples of said diethers are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane and 9,9-bis(methoxymethyl)fluorene.

The aPP is prepared by polymerization of alpha-olefins, particularly of propylene, in the presence of a catalyst comprising the product obtained by contacting a metallocene compound with a cocatalyst.

All of the above polymerization processes wherein the catalyst is a metallocene compound are carried out in the presence of an activating cocatalyst as well.

Suitable activating cocatalysts are alumoxanes or compounds capable of forming an alkyl metallocene cation.

Alumoxanes useful as the cocatalyst can be linear alumoxanes of the formula (II):

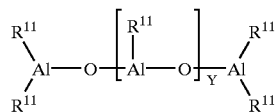

wherein $R^{11}$ is selected from the group consisting of halogen, linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl and $C_7$–$C_{20}$ arylalkyl radicals and y ranges from 0 to 40; or cyclic alumoxanes of the formula (III):

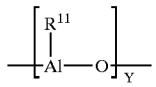

wherein $R^{11}$ has the meaning herein described and y is an integer ranging from 2 to 40.

The above alumoxanes can be obtained according to procedures known in the art, by reacting water with an organo-aluminum compound having the formula $AlR^{11}_3$ or $Al_2R^{11}_6$, with the condition that at least one $R^{11}$ is not halogen. In this case, the molar ratios of Al/water in the reaction are between 1:1 and 100:1. Particularly suitable are the organometallic aluminum compounds of formula (II) described in EP 575875 and those of formula (II) described in WO 96/02580. Moreover, suitable cocatalysts are those described in WO 99/21899 and in the European patent app. 99203110.4.

The molar ratio of aluminum to the metal of the metallocene compound is between about 10:1 and about 5000:1, and preferably between about 100:1 and about 4000:1.

Examples of alumoxanes suitable as activating cocatalysts in the process of the invention are methylalumoxane (MAO), tetra-isobutylalumoxane (TIBAO), tetra-2,4,4-trimethylpentylalumoxane (TIOAO) and tetra-2-methylpentylalumoxane. Mixtures of different alumoxanes can also be used.

Nonlimiting examples of aluminum compounds having the formula $AlR^{11}_3$ or $Al_2R^{11}_6$ are: tris(methyl)aluminum, tris(isobutyl)aluminum, tris(isooctyl)aluminum, bis(isobutyl)aluminum hydride, methyl-bis(isobutyl)aluminum, dimethyl(isobutyl)aluminum, tris(isohexyl)aluminum, tris(benzyl)aluminum, tris(tolyl)aluminum, tris(2,4,4-trimethylpentyl)aluminum, bis(2,4,4-trimethylpentyl) aluminum hydride, isobutyl-bis(2-phenylpropyl)aluminum, diisobutyl-(2-phenylpropyl)aluminum, isobutyl-bis(2,4,4-trimethylpentyl)aluminum, diisobutyl-(2,4,4-trimethylpentyl)aluminum, tris(2,3-dimethylhexyl)aluminum, tris(2,3,3-trimethylbutyl)aluminum, tris(2,3-dimethylbutyl)aluminum, tris(2,3-dimethylpentyl)aluminum, tris(2-methyl-3-ethylpentyl)aluminum, tris(2-ethyl-3-methylbutyl)aluminum, tris(2-ethyl-3-methylpentyl)aluminum, tris(2-isopropyl-3-methylbutyl)aluminum and tris(2,4-dimethylheptyl)aluminum. Particularly preferred aluminum compounds are trimethylaluminum (TMA), tris(2,4,4-trimethylpentyl) aluminum (TIOA), triisobutylaluminum (TIBA), tris(2,3,3-trimethylbutyl)aluminum and tris(2,3-dimethylbutyl) aluminum.

Mixtures of different organometallic aluminum compounds and/or alumoxanes can also be used.

In the catalyst system used in the process of the invention, both the titanium complex and the alumoxane can be pre-reacted with an organometallic aluminum compound having the formula $AlR^{11}_3$ or $Al_2R^{11}_6$, wherein $R^{11}$ has the meaning given above.

Further suitable activating cocatalysts are those compounds capable of forming an alkylmetallocene cation. Preferably, these compounds have the formula $Y^+Z^-$, wherein $Y^+$ is a Brønsted acid capable of donating a proton and of reacting irreversibly with a substituent X of the compound of formula (I), and $Z^-$ is a compatible noncoordinating anion, capable of stabilizing the active catalytic species that result from the reaction of the two compounds, and that are sufficiently labile to be displaced by an olefinic substrate. Preferably, the $Z^-$ anion comprises one or more boron atoms. More preferably, the anion $Z^-$ is an anion having the formula $BAr_4^{(-)}$, wherein the Ar substituents can be the same or different and are aryl radicals such as phenyl, pentafluorophenyl, and bis(trifluoromethyl)phenyl. Tetrakis-pentafluorophenyl borate is particularly preferred. Moreover, compounds having the formula $BAr_3$ can be used.

The catalysts of the present invention can also be used on an inert support, by depositing the metallocene, or the reaction product of the metallocene with the cocatalyst, or the cocatalyst and successively the metallocene, on the inert support, such as silica, alumina, magnesium halides, olefin polymers or prepolymers (i.e., polyethylenes, polypropylenes or styrenedivinylbenzene copolymers). The thus obtained supported catalyst system, optionally in the presence of alkylaluminum compounds, either untreated or pre-reacted with water, can be employed in gas-phase polymerization processes. The solid compound so obtained, in combination with further addition of the alkyl aluminum compound as such or prereacted with water, can be employed in gas phase polymerization.

The composition of the present invention can also contain various additives generally used in polymer compositions. Examples are reinforcing agents and fillers, heat stabilizers, antioxidants, light stabilizers, antistatic agents, lubricants, nucleating agents, flame retardants, pigments or dyes, glass fiber, carbon fiber, calcium carbonate, calcium sulfate, barium sulfate, magnesium hydroxide, mica, talc, or clay.

The components of the composition of the present invention can be prepared in one or more stage(s).

The preparation of the present composition is not critical and can be carried out by methods commonly used in the preparation of conventional polypropylene compositions. The composition can be prepared by blending the polymers in the molten state in an apparatus equipped with mixing elements such as an internal mixer or extruder. For example, one can use a Banbury mixer or a single-screw extruder or a twin-screw type extruder. The order of mixing of the components is not relevant.

An alternative method for preparing the present composition is sequential polymerization of the monomers in two or more stages.

An example of a two-stage process is as follows:
the matrix, i.e., the blend of components (I) and (II), is prepared by synthesizing components (I) and (II) in one stage as reported in international patent application WO 96/23838. According to WO 96/23838, the intimate blends are produced by simultaneously polymerizing propylene and, optionally, the co-monomers, with two or more cyclopentadienyl transition metal compounds selected to produce the desired molecular weight and crystalline or amorphous character. Preferably, the cyclopentadienyl transition metal compounds are used at the same time and combined with the same non-coordinating anion activator or alumoxane;
the second stage consists of synthesizing component (III). An example of such a polymerization process is reported in WO 96/112118.

The melt index of the composition of the present invention generally ranges from 0.1 g/10 min to 30 g/10 min.

The compositions of the invention are generally obtained in the form of pellets. These can be transformed into shaped articles, such as containers for food and drinking water and other liquids, medical articles, such as bags or tubes, and heating equipment, by known processes, such as injection, co-injection molding, extrusion and blow molding processes. They can also be obtained as sheets and films for food packaging by known processes, for example, extrusion, film casting or film blowing.

The following examples are given to illustrate but not limit the present invention.

The method used to obtain the property data reported in the examples and description are identified below.

Xylene-soluble fraction: a solution of the sample in xylene at a concentration of 1% by weight is prepared and kept at 135° C. for one hour while stirring. The solution is allowed to cool to 95° C., while stirring, after which it is kept for 20 minutes without stirring, and for 10 minutes with stirring. The solution is then filtered, and acetone is added to an aliquot of the filtrate to cause the polymer dissolved therein to precipitate. The polymer thus obtained is recovered, washed, dried, and weighed to determine the weight of the xylene soluble fraction.

Melt Index "L" (MIL): according to ASTM D 1238, condition L;

$^{13}$C-NMR analysis of the polymers is carried out on a Bruker DPX 400 spectrometer operating at 400.13 MHz. The samples are analyzed as solutions in tetrachlorodideuteroethane at 120° C.

Differential Scanning Calorimetry (DSC) analysis is carried out on a DSC-7 instrument from Perkin Elmer Co. Ltd. according to the following procedure. About 10 mg of sample are heated from 40 to 200° C. at a rate of 20° C./minute; the sample is held for 5 minutes at 200° C. and then cooled to 40° C. at the same rate. A second heating scan is then carried out using the same procedure as the first one. The melting temperatures $T_m$ and melting entalphy $\Delta H_m$ reported here are second scan values.

Weight average molecular weight ($M_w$) and number average molecular weight ($M_n$): Gel Permeation Chromatography analysis carried out on a WATERS 150 instrument in ortho-dichlorobenzene at 135° C.

Intrinsic viscosity (I.V.): measured in tetraline at 135° C.

Density: according to ASTM D 1505;

Haze: according to ASTM D 1003;

Hardness Shore A/D: according to ASTM D 2240;

Izod impact resistance: according to ASTM D 256.

Polymers Used in the Examples and Comparative Examples

Isotactic Propylene Homopolymer (cPP1)

It has MI"L"=0.7 dg/min, I.V.=2.8 dl/g, $M_w/M_n$=7, density=0.900 g/ml, $T_m$=162° C., $\Delta H_m$=100 J/g; the fraction soluble in xylene at room temperature is 5 wt. %. It is obtained by polymerization of propylene in the presence of a high yield and highly stereospecific Ziegler-Natta catalyst, supported on magnesium chloride.

Isotactic Propylene Homopolymer (cPP2).

It has MI"L"=23 g/10 min, I.V.=1.35 dl/g, $M_w/M_n$=3, density=0.900 g/ml, $T_m$=153° C., $\Delta H_m$=90 J/g; the fraction soluble in xylene at room temperature is 0.5 wt. %. It is obtained by polymerization of propylene in the presence of the racemic form of dimethylsilanediyl-bis[1-(2-ethyl-4-phenylindenyl)]zirconium dichloride.

It is marketed by Montell Italia S.p.A as Moplen Q30P.

Crystalline Propylene Copolymer EP2X30F (cPP3).

It is a copolymer of propylene with 3 wt. % (i.e., 4.4 mol %) ethylene having MI"L"=9 dg/10 min, I.V.=1.5 dl/g, $M_w/M_n$=7, density=0.900 g/ml, $T_m$=144° C., $\Delta H_m$=80 J/g; the fraction soluble in xylene at room temperature is 7 wt. %. It is obtained by polymerization of propylene in the presence of a high yield and highly stereospecific Ziegler-Natta catalyst, supported on magnesium chloride.

Atactic Propylene Homopolymer (aPP1)

It has density=0.850 g/ml, I.V.=1.55 dl/g; DSC analysis shows no melting peak. $^{13}$C-NMR analysis gives the following distribution of triads and pentads:

| $^{13}$C-NMR | Triad distribution % | | | Pentad Distribution % | | | mmmm/ rrrr | mmmm/ mmmr |
|---|---|---|---|---|---|---|---|---|
| | mm | rm | rr | mmmm | mmmr | rrrr | | |
| aPP2 | 33.9 | 40.9 | 25.2 | 14.80 | 14.24 | 6.41 | 2.31 | 1.04 |

It is prepared by using the racemic form of isopropylidene-bis[1-(3-isopropylindenyl)]zirconium dichloride, rac-Me$_2$C[1-(3-iPr-Ind)]$_2$ZrCl$_2$, the synthesis of which is carried out as described in WO 96/22995.

The polymerization of aPP 1 was carried out as follows: propylene was charged at room temperature into a 1-liter jacketed stainless steel autoclave, equipped with a magnetically driven stirrer and a 35-ml stainless steel vial, connected to a thermostat for temperature control, previously purified by washing with a TIBA solution in hexane and dried at 50° C. in a stream of propylene. AliBu$_3$ (1 mmol in hexane) was added as a scavenger before the monomer. The autoclave was then held at 2° C. below the polymerization temperature. Then the toluene solution containing the catalyst/cocatalyst mixture was injected into the autoclave by means of nitrogen pressure through the stainless steel vial, the temperature was rapidly raised to the polymerization temperature (45° C.) and the polymerization was carried out at constant temperature for 1 hour. 2 mg of rac-Me$_2$C[1-(3-iPr-Ind)]$_2$ZrCl$_2$ as catalyst were used. The Al/Zr molar ratio was 1000. After venting the unreacted monomer and cooling the reactor to room temperature, the polymer was dried under reduced pressure at 60° C.

Atactic Propylene Homopolymer (aPP2)

It has density=0.850 g/ml and an intrinsic viscosity of 1.67 dl/g; DSC analysis shows no melting peak. The (B) index is 0.99, %(r)-%(m)=17.7. The weight average molecular weight is about 250,000 and $M_w/M_n$ is 2.5.

It was obtained by polymerization of propylene in the presence of dimethylsilanediyl-bis(9-fluorenyl)zirconium dichloride, Me$_2$Si(9-Flu)$_2$ZrCl$_2$, the synthesis of which was carried out as described in EP-A-604917. The polymerization process was the same as the one for producing aPP1.

Polymer Blend of Isotactic Propylene Homopolymer and Atactic Propylene Homopolymer (aPP/cPP In Situ Blend).

The blend has MI"L"=1.92 g/10 min, I.V.=1.84 dl/g, density=0.880 g/cc, $T_m$=149° C., $\Delta H_m$=55 J/g; the xylene insoluble fraction is 54.2 wt. % (I.V.=1.71 dl/g), the xylene soluble fraction is 45.8 wt. % (I.V.=2.37 dl/g).

It was prepared by using the racemic form of dimethylsilanediyl-bis[1-(2-methylindenyl)]zirconium dichloride, rac-Me$_2$Si[1-(2-Me-Ind)]$_2$ZrCl$_2$ (a catalyst commerically available from Boulder Scientific Company, USA, and described in EP-A-576970) and di-n-butylsilanediyl-bis (9-fluorenyl)zirconium dichloride, Bu$_2$Si(Flu)$_2$ZrCl$_2$; the latter was synthesized as described in EP-A-604917.

Into a 350 ml glass reactor, equipped with a thermometer, refluxing condenser, blade stirrer and thermoregulation system, 150 ml of toluene and 26.6 g (458.6 mmol) of MAO in powder form were introduced under nitrogen atmosphere and held at a temperature of 25° C. 40 ml of a toluene solution containing 526.9 mg (1.105 mmol) of rac-Me$_2$Si [1-(2-Me-Ind)]$_2$ZrCl$_2$ were mixed with a 40 ml of a toluene solution containing 760.8 mg (1.202 mmol) of Bu$_2$Si(Flu)$_2$ ZrCl$_2$.

The solution with the metallocenes was added to the reactor over a period of 20 minutes and the red-brown mixture was stirred for 30 minutes. Slowly (20 minutes), 26.3 g of Grace 955/60 w silica (dried at 800° C.) were added and the whole was stirred for 30 minutes at 25° C. After heating the slurry to 70° C., the solvent was evaporated under vacuum to obtain a free flowing powder.

A 100 l steel autoclave equipped with magnetic stirrer, pressure and temperature indicator, system for loading the catalyst, monomer feed line and jacket, was purged by washing with propylene at 70° C. for 2 hours. At 25° C., 60 mmol of triethylaluminum (TEAL) as a 10 wt. %/v solution in hexane, and 60 l of liquid propylene were introduced into the reactor and the temperature was raised to 46° C. The catalytic suspension was prepared in a round glass bottle by contacting 12.55 g of dry prepolymerized catalyst and 5 mmol of TEAL in 60 ml of dry hexane. The suspension was then siphoned into a stainless steel vial and the catalyst was introduced into the autoclave by a nitrogen overpressure. The temperature was raised to 50° C. and maintained constant during the polymerization. After 25 minutes, a second catalytic suspension (13.8 g/5 mmol TEAL) was injected into the autoclave. After 90 minutes, the reactor was degassed and purged with nitrogen overnight. 18.7 Kg of a blend of crystalline and atactic PP was recovered.

Poly(Ethylene-co-1-Butene)

It contains 25% by weight of units derived from 1-butene ($^{13}$C-NMR analysis). The density is 0.875 g/ml and the intrinsic viscosity is 1.24 dl/g. It is commercially available from Exxon Chemical under the trademark Exact® 4049.

Poly(Ethylene-co-1-Butene)

It contains 21% by weight of units derived from 1-butene ($^{13}$C-NMR analysis). The density is 0.881 g/ml and the intrinsic viscosity is 1.79 dl/g. It is commercially available from Exxon Chemical under the trademark Exact® 4033.

Poly(Ethylene-co-1-Octene)

It contains 32% by weight of units derived from 1-octene (IR analysis according to Dow Chemical). The density is 0.871 g/ml and the intrinsic viscosity is 1.74 dl/g. It is commercially available from Dow Chemical under the trademark Engage® 8150.

Poly(Ethylene-co-1-Octene)

It contains 33% by weight of units derived from 1-octene (13C-NMR analysis). The density is 0.865 g/ml and the intrinsic viscosity is 1.79 dl/g. It is commercially available from Dow Chemical under the trademark Engage® 8180.

Examples 1–11 and Comparative Examples 1c–7c

The polymers listed in Tables 1–5 were blended together in a Banbury at 200° C. for 10 min at 50 rpm. 0.2 wt % of Irganox® B215 (pentaerithryl-tetrakis[3(3,5-di-tert-butyl-4-hydroxyphenyl] propionate and tris(2,4-ditert-butylphenyl) phosphite in the ratio of 1:1) was previously added to each of these blends.

Tables 1–5 show the amounts of polymers (percentages by weight) blended as well as the properties.

The blend obtained was compression molded into plaques of 1 mm thickness at 200° C. for 5 min and subsequently cooled in a water-cooled press. Haze and Shore D hardness were measured on these plaques and are reported in Tables 1–5.

Izod impact resistance was measured on 3 mm thick plaques of the same blends, molded at 200° C. for 5 min and cooled to room temperature at a rate of 15° C./min.

TABLE 1

| Examples and comparative examples | 1 | 1c | 2c |
|---|---|---|---|
| cPP1 (Moplen Q30P)(wt. %) | 33 | 100 | 50 |
| aPP1 (wt. %) | 33 | 0 | 50 |
| Exact 4049 (wt. %) | 34 | 0 | 0 |
| Haze (%) | 42 | 80 | 61 |
| Hardness Shore D (points) | 34 | 69 | 39 |
| Izod impact resistance at −20° C. (J/m) | 100 | <20 | <20 |

TABLE 2

| Example and comparative examples | 2 | 3c | 4c |
|---|---|---|---|
| cPP2 (wt. %) | 33 | 100 | 50 |
| aPP2 (wt. %) | 33 | 0 | 50 |
| Exact 4049 (wt. %) | 34 | 0 | 0 |
| Haze (%) | 47 | 80 | 59 |
| Hardness Shore D (points) | 32 | 68 | 39 |
| Izod impact resistance at −20° C. (J/m) | 100 | <20 | <20 |

TABLE 3

| Examples and comparative example | 3 | 4 | 5c |
|---|---|---|---|
| aPP/cPP in situ blend (wt. %) | 70 | 70 | 100 |
| Exact 4033 (wt. %) | 30 | 0 | 0 |
| Exact 4049 (wt. %) | 0 | 30 | 0 |
| Haze (%) | 78 | 75 | 97 |
| Hardness Shore D (points) | 38 | 41 | 38 |
| Izod impact resistance at −20° C. (J/m) | >50 | >50 | <20 |

TABLE 4

| Examples and comparative examples | 5 | 6 | 7 | 6c | 7c |
|---|---|---|---|---|---|
| cPP3 (EP2X30F) (wt. %) | 40 | 40 | 30 | 100 | 50 |
| aPP2 (wt. %) | 20 | 30 | 20 | 0 | 50 |
| Exact 4033 (wt. %) | 40 | 30 | 50 | 0 | 0 |
| Haze (%) | 40 | 46 | 38 | 76 | 50 |
| Hardness Shore D (points) | 39 | 35 | 36 | 68 | 37 |
| Izod impact resistance at −20° C. (J/m) | — | 90 | — | <20 | <20 |

TABLE 5

| Examples | 8 | 9 | 10 | 11 |
|---|---|---|---|---|
| cPP3 (EP2X30F) (wt. %) | 30 | 30 | 30 | 20 |
| aPP2 (wt. %) | 30 | 50 | 40 | 50 |
| Exact 4049 (wt. %) | 40 | 0 | 0 | 0 |

TABLE 5-continued

| Examples | 8 | 9 | 10 | 11 |
|---|---|---|---|---|
| Engage 8150 (wt. %) | 0 | 20 | 30 | 0 |
| Engage 8180 (wt. %) | 0 | 0 | 0 | 30 |
| Haze (%) | 35 | 33 | 33 | 29 |
| Hardness Shore D (points) | 28 | 23 | 27 | — |
| Hardness Shore A (points) | 89 | 84 | 88 | 74 |
| Izod impact resistance at −20° C. (J/m) | 120 | — | — | — |

What is claimed is:

1. An elastomeric thermoplastic polyolefin composition comprising:
   (I) a crystalline propylene polymer (cPP) containing at least 80% by weight of a fraction insoluble in xylene at room temperature, the intrinsic viscosity being higher than 0.5 dl/g;
   (II) an atactic or amorphous propylene polymer (aPP) having an intrinsic viscosity higher than 0.5 dl/g; and
   (III) an elastomeric olefin polymer (eOP) consisting of copolymers of ethylene with a comonomer selected from $C_3$–$C_8$ α-olefins, the intrinsic viscosity thereof ranging from 1 to 4 dl/g;
wherein the density of the elastomeric olefin polymer ($d_{eOP}$) satisfies the following relationship:

$$d_{eOP} \pm 0.005 = \{d_{cPP} \times [w_{cPP}/(w_{cPP}+w_{aPP})]\} + \{d_{aPP} \times [w_{aPP}/(w_{cPP}+w_{aPP})]\} \quad (1)$$

where $w_{cPP}$ and $w_{aPP}$ are the weight percentage content of components (I) and (II) respectively and $d_{cPP}$ and $d_{aPP}$ are the density at room temperature of components (I) and (II) respectively.

2. The composition of claim 1 comprising:
   (I) 1–55 wt. % of the crystalline propylene polymer (cPP),
   (II) 1–55 wt. % of the atactic or amorphous propylene polymer (aPP); and
   (III) 1–55 wt. % of the elastomeric olefin polymer (eOP), based on the total amount (100 wt. %) of components (I) to (III).

3. The composition of claim 1 wherein the crystalline propylene polymer is selected from the group consisting of (a) an isotactic propylene hompolymer, and (b) random copolymers of propylene with recurring units derived from monomers selected from the group consisting of (I) ethylene, (II) 1-butene, and (III) mixtures thereof.

4. The composition of claim 1 wherein the atactic or amorphous propylene polymer (aPP) is selected from the group consisting of (a) a propylene homopolymer, and (b) a copolymer of propylene with recurring units derived from monomers selected from the group consisting of (I) ethylene, (II) 1-butene, and (III) mixtures thereof.

5. The composition of claim 4 wherein the atactic or amorphous propylene polymer (aPP) has the following properties:
   the ratio of the pentads (mmmm)/(rrrr) is equal to or greater than 1.5; and
   the ratio of the pentads (mmmm)/(mmmr) is equal to or greater than 0.8.

6. The composition of claim 4 wherein the crystalline propylene polymer (cPP) is an isotactic propylene polymer.

7. The composition of claim 4 wherein the atactic or amorphous propylene polymer (aPP) has syndiotactic diads (r) more numerous than the isotactic ones (m).

8. The composition of claim 7 wherein the crystalline propylene polymer is a syndiotactic propylene polymer.

9. The composition of claim 1 wherein the elastomeric olefin polymer is a copolymer of ethylene and from 20 to 40 wt. % of 1-butene or 1-octene.

10. A process for preparing the composition of claim 1 comprising blending polymers (I)–(III) in the molten state.

11. An article comprising the composition of claim 1.

* * * * *